(12) United States Patent  
Netrval

(10) Patent No.: US 8,179,827 B2  
(45) Date of Patent: May 15, 2012

(54) DATA PROCESSING APPARATUS AND METHOD FOR TRANSMITTING DATA IN A DATA PROCESSING APPARATUS

(75) Inventor: Filip Netrval, Vienna (AT)

(73) Assignee: Infineon Technologies AG, Neubiberg (DE)

( * ) Notice: Subject to any disclaimer, the term of this patent is extended or adjusted under 35 U.S.C. 154(b) by 1417 days.

(21) Appl. No.: 11/147,854

(22) Filed: Jun. 8, 2005

(65) Prior Publication Data

US 2006/0041697 A1   Feb. 23, 2006

(30) Foreign Application Priority Data

Jun. 8, 2004 (DE) .......................... 10 2004 027 853

(51) Int. Cl.
G08C 17/00 (2006.01)
H04B 1/16 (2006.01)
H04B 1/38 (2006.01)
(52) U.S. Cl. ...................... 370/311; 455/574; 455/343.2
(58) Field of Classification Search ................ 370/310, 370/311, 321, 345, 348; 455/414.1, 550.1, 455/572, 574
See application file for complete search history.

(56) References Cited

U.S. PATENT DOCUMENTS

| | | | |
|---|---|---|---|
| 7,313,419 B2 * | 12/2007 | Islam et al. | 455/574 |
| 7,319,885 B2 * | 1/2008 | Mukai et al. | 455/550.1 |
| 2003/0086379 A1 * | 5/2003 | Terry et al. | 370/279 |
| 2004/0015732 A1 | 1/2004 | El-Kik et al. | 713/300 |
| 2004/0087350 A1 * | 5/2004 | Nagasawa | 455/572 |

FOREIGN PATENT DOCUMENTS

| | | |
|---|---|---|
| DE | 4130000 | 9/1991 |
| EP | 0459247 | 5/1991 |

* cited by examiner

*Primary Examiner* — Michael Thier
(74) *Attorney, Agent, or Firm* — Dickstein Shapiro LLP

(57) ABSTRACT

A data processing apparatus and method for transmitting data in a data processing apparatus are provided. A data processing apparatus provided has a data input for receiving data, a processor for processing the data with an input, a data supply suppression unit which is connected between the data input and the input and suppresses or permits supply of the data from the data input to the input, and a control unit coupled to the data supply suppression unit for producing a control signal. The control signal represents at least one operating condition or a quiescent condition for the processor. The data supply suppression unit is suitable for suppressing or permitting supply of the data from the data input to the input. It is set up such that it suppresses supply of the data from the data input to the input when the control signal represents a quiescent condition for the processor.

11 Claims, 2 Drawing Sheets

DATA PROCESSING APPARATUS AND METHOD FOR TRANSMITTING DATA IN A DATA PROCESSING APPARATUS

CROSS-REFERENCE TO RELATED APPLICATION

This application claims priority from German Patent Application No. 10 2004 027 853.9, which was filed on Jun. 8, 2004, and is incorporated herein by reference in its entirety.

TECHNICAL FIELD

The invention relates to a data processing apparatus and to a method for transmitting data in a data processing apparatus.

BACKGROUND

A data processing apparatus processes an incoming data stream in order to ascertain or calculate output data therefrom. Known examples of a data processing apparatus include a circuit architecture with logic gates, such as a digital signal processor (DSP).

Particularly in a digital data transmission system such as a mobile radio system, a data processing apparatus is used in a receiver apparatus, for example. The data processing apparatus has at least one processor which is used to ascertain information contained in incoming data. Since a large number of different algorithms or methods can be used to ascertain the information, the data processing apparatus often contains a large number of processors operating in parallel or in series, which process the incoming data stream independently or in parallel with one another.

In mobile digital data transmission systems, including in a UMTS mobile radio system, the data processing apparatus processes incoming data which have been transmitted at different data transmission rates or with different transmission properties for the transmission channels. The transmission properties can change very quickly over time. This means that during particular periods there is a condition during which a processor processes the incoming data even though the output data which it provides are not used further. The data processing apparatus consumes power as a result of its switching the logic gates or blocks contained in the processors. This unnecessary power consumption has the associated drawback, particularly in mobile data transmission systems, that the limited resource of a power supply belonging to the data processing apparatus is subjected to unnecessary load.

To overcome this drawback, individual processors are usually decoupled from the power supply for the period in which they process data which are not associated with them. In this case, the processor is in a quiescent condition. In data transmission systems with poor or constantly changing quality for the transmission channels, the operating condition of a processor can quickly change from a quiescent condition to an operating condition, however. Since, when the processor is coupled to the power supply, a turn-on time is required until this processor operates reliably, the aforementioned measure cannot always be used. The aim of looking after the resources of the power supply to a large extent is not fulfilled in optimum fashion.

SUMMARY

The present invention is based on the problem of providing a data processing apparatus having reduced power consumption and a method for transmitting data in a data processing apparatus having reduced power consumption.

The data processing apparatus has
- at least one data input for receiving data,
- a processor for processing the data with at least one input,
- a data supply suppression unit connected between the data input and the input, and
- a control unit coupled to the data supply suppression unit for producing a control signal which represents at least one operating condition or a quiescent condition for the processor.

The data supply suppression unit is set up such that it suppresses supply of the data from the data input to the input when the control signal represents a quiescent condition for the processor. The data input and the input are in this case typically suited to receiving data transmitted in series or in parallel using a bandwidth of x bits.

It is a fundamental concept of the invention that the supply of data to the processor is suppressed when the processor is in a quiescent condition. This means that no operations which require a logic gate to be switched will take place within the processor. The power consumption caused by switching logic gates is eliminated, which means that the data processing apparatus looks after the resources of the power supply.

The mobile data processing appliance may be in the form of a mobile radio or a portable computer, for example.

The method for transmitting data in a data processing apparatus has the following steps:
- data are received at a data input,
- the data are supplied to an input of a processor,
- a control signal is produced which represents at least one operating condition or a quiescent condition for the processor, and
- the supply of the data from the data input to the input is suppressed when the control signal represents a quiescent condition for the processor.

Preferred refinements of the invention are specified in the dependent patent claims.

In one refinement, the data processing apparatus has at least one second processor, which has a second input, for processing the data,
- wherein the control signal represents at least one operating condition or a quiescent condition for the second processor,
- wherein the data supply suppression unit is connected between the data input and the second input, and
- wherein the data supply suppression unit is set up such that it suppresses supply of the data from the data input to the second input when the control signal represents a quiescent condition for the second processor.

In one alternative refinement, the data processing apparatus has
- at least one second processor, which has a second input, for processing the data and
- a second data supply suppression unit which is connected between the data input and the second input and which is coupled to the control unit,
- wherein the control unit produces at least one second control signal which represents at least one operating condition or a quiescent condition for the second processor, and wherein the second data supply suppression unit is set up such that it suppresses supply of the data from the data input to the second input when the control signal represents a quiescent condition for the second processor.

This refinement is associated with the advantage that suppression of the data on the processor and suppression of the data on the second processor can be brought about or controlled independently of one another. The data processing apparatus can thus be used more flexibly.

In one development, the processor is in a quiescent condition when the second processor is in an operating condition. This allows the data processing apparatus to be used in a particularly energy-saving manner in a time-division multiplex method, with the data transmitted in a timeslot being processed by just one processor.

Typically, the data are data transmitted using a time-division multiplex method with at least two timeslots.

In this case, the control unit normally produces a control signal representing a quiescent condition for the processor for the duration of at least one timeslot.

This is particularly advantageous when the timeslot method is used as a multiplex method, which means that the data transmitted in at least one timeslot or frame are processed by a processor in the data processing apparatus, while the data transmitted in a further timeslot are not processed by the processor. The duration of the control signal representing a quiescent condition can thus always be chosen for the duration of at least one timeslot.

In a further refinement of the data processing apparatus, the data supply suppression unit provides a constant voltage potential at the input when the control signal represents a quiescent condition for the processor. This ensures that the processor is not able to switch logic gates which it contains.

Preferably, the constant voltage potential is a zero potential.

In one embodiment of the data processing apparatus, the data supply suppression unit has at least one AND gate with a third input and a fourth input, the data input being coupled to the third input, and the fourth input being coupled to the control unit in order to receive the control signal. This embodiment of the data supply suppression unit allows simple hardware implementation which can be introduced into a data path within the data processing apparatus without further measures. If the data length of the transmitted data corresponds to x bits, then the AND gate is in the form of an x-bit AND gate.

In one alternative embodiment, the data supply suppression unit has at least one multiplexer, controlled by the control signal, with a fifth input and a sixth input, the data input being coupled to the fifth input, and the sixth input being coupled to a constant voltage potential. The fact that the data supply suppression unit is in the form of a multiplexer likewise permits simple hardware implementation.

The inventive data processing apparatus is typically used in a mobile data processing appliance. Low power consumption is advantageous particularly in the case of mobile appliances. This allows the operating time of the mobile data processing appliance to be extended, inter alia.

BRIEF DESCRIPTION OF THE DRAWINGS

The invention is explained in more detail below using exemplary embodiments with reference to the drawing, in which.

DETAILED DESCRIPTION

Figure 1:
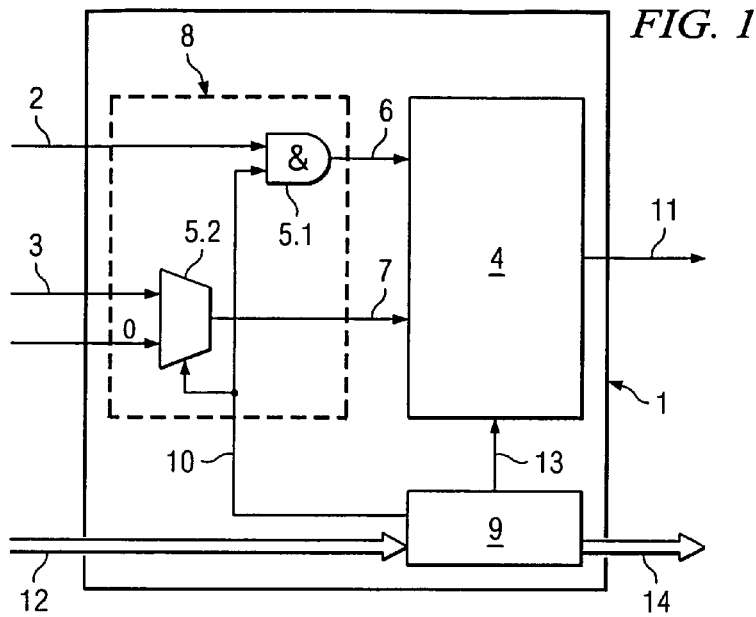
FIG. 1 shows a schematic illustration of the data processing apparatus in line with an exemplary embodiment of the invention.

FIG. 1 shows a schematic illustration of a data processing apparatus 1 in line with an exemplary embodiment of the invention. The data processing apparatus 1 has two data inputs 2, 3. The data inputs 2, 3 can receive data which are processed in a processor 4 within the data processing apparatus 1. The output data ascertained from the data by the processor 4 are supplied to a data output 11 and can thus be read from the data processing apparatus 1. The processor 4 for its part has two inputs 6, 7 for receiving the data. The data inputs 2, 3 are connected to the inputs 6, 7 via a data supply suppression unit 8 (shown in dashes). The data supply suppression unit 8 has an AND gate 5.1, which is connected in the data path between one of the data inputs 2 and one of the inputs 6, and a multiplexer 5.2. In this case, a first multiplexer input of the multiplexer 5.2 is connected to the other data input 3, and a multiplexer output is connected to the other input 7. In addition, a second multiplexer input is provided to which a constant voltage potential, in this case a zero potential 0, is applied.

The data processing apparatus 1 likewise comprises a control unit 9 which is coupled to the data supply suppression unit 8 via a control line 10. The control line 10 is in this case coupled both to an input of the AND gate 5.1 and to a multiplexer control input of the multiplexer 5.2. The control unit 9 is additionally coupled to the processor 4 via a second control line 13. A control data input 12, which is coupled to the control unit 9, can be used to supply the control unit 9 with control data from outside the data processing apparatus 1. A control data output 14, which is coupled to the control unit 9, can be used to read control output data from the control unit 9 from outside the data processing apparatus 1.

The data processing apparatus 1 may be designed for processing data transmitted serially and/or in parallel. If the data word length of the transmitted data is x bits, for example, then the data inputs 2, 3 and the inputs 6, 7 are accordingly designed for a data word length of x bits. The AND gate is in the form of an x-bit AND gate, and the multiplexer inputs and the multiplexer output are designed for a data word length of x bits. Typical data word lengths are four or eight bits.

The way in which the data processing apparatus 1 shown in FIG. 1 works will now be explained below:

At the data inputs 2, 3, data are received which are supplied to the inputs 6, 7 of the processor 4. In this case, the supply of the data is permitted or suppressed by the data supply suppression unit 8. The data supply suppression unit 8 permits or suppresses the supply of data on the basis of a control signal which is transmitted to the data supply suppression unit 8 by the control unit 9 via the control line 10. The control signal is produced by the control unit 9 on the basis of an operating condition in the processor 4. If the processor 4 is in an operating condition, then the control unit 9 produces a control signal which prompts the data supply suppression unit 8 to permit the supply of the data to the inputs 6, 7. If the processor 4 is in a quiescent condition, then the control unit 9 produces a control signal which prompts the data supply suppression unit 8 to suppress the supply of the data to the inputs 6, 7.

If, by way of example, the control signal applied is a potential level which corresponds to a bit value of "1", then the AND gate 5.1 will again supply the input 6 with the data supplied to the data input 2, so that the data supply suppression unit 8 allows the data to be supplied from the data input 2 to the input 6. If the control signal has a potential level which corresponds to a bit value of "0"—usually a zero potential—then the AND gate 5.2 will supply the input 6 with a constant bit value "0", regardless of the data supplied to the data input 2. So long as the control signal corresponds to the bit value "0", there are thus no switching processes taking place in logic gates in the processor 4, which prevents a charge reversal process on the logic gates.

The way in which the multiplexer 5.2 works in the data supply suppression unit 8 is similar, with the connected channel being determined by the control signal.

The information about the operating condition of the processor 4 can be obtained by the control unit 9 from control data transmitted via the control data input 12. It is likewise conceivable for the control unit to process a clock signal and for the processor 4 to be in a quiescent condition during at least one particular time period and to be in an operating condition during a subsequent time period.

Preferably, the data are transmitted using a time-division multiplex method. A time-division multiplex method has a plurality of timeslots, with particular groups of data being transmitted within a timeslot. The control unit 9 may have been set up such that it permits supply of the data to the processors only during a stipulated timeslot, and otherwise suppresses it. The information about the timeslot can be obtained by the control unit 9 from the control data, for example. However, it is also conceivable for the control unit 9 to include a clock signal and to obtain information about the timeslot in this way.

Figure 2:
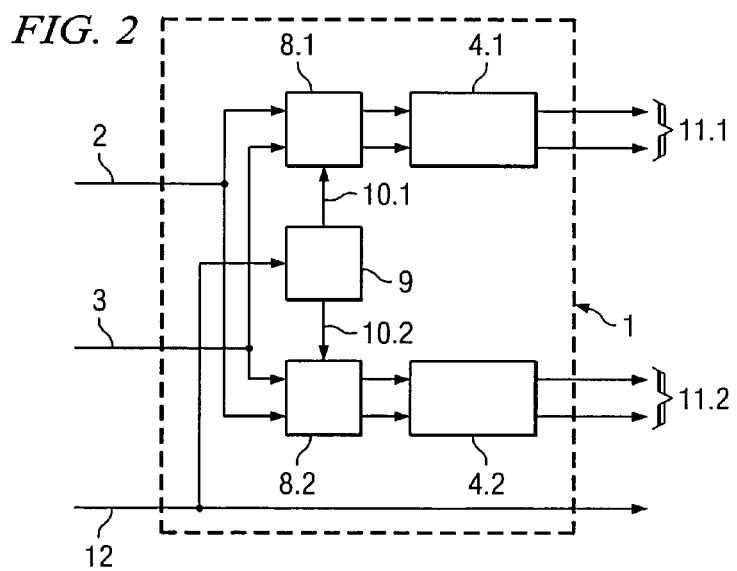
FIG. 2 shows a further exemplary embodiment of the data processing apparatus with a second processor, FIG. 3 schematically shows a Rake receiver, FIG. 4 schematically shows the frame structure of data transmitted in the UMTS standard using the channel DPCH.

FIG. 2 shows a further exemplary embodiment of the inventive data processing apparatus 1 with a second processor 4.2. The data processing apparatus 1 has a processor 4.1 and the second processor 4.2, which are both suitable for processing supplied data. The processing of the data in the two processors takes place independently of one another. The output data from the processor 4.1 and from the second processor 4.2 are respectively supplied via a data output 11.1 or 11.2 associated with the corresponding processor 4.1 or 4.2. To receive the data, the data processing apparatus 1 has two data inputs 2, 3, which are connected to the processor 4.1 via a data supply suppression unit 8.1 and to the second processor 4.2 via a second data suppression unit 8.2. A control unit 9 is connected to the data supply suppression unit 8.1 via a control line 10.1 and to the second data supply suppression unit 8.2 via a second control line 10.2. A first control signal supplied via the control line 10.1 prompts the data supply suppression unit 8.1 to permit or suppress supply of data from the data input 2, 3 to the processor 4.1. Equally, the second data supply suppression unit 8.2 is controlled by means of a second control signal, which is supplied via the second control line 10.2. The first and second control signals are produced by the control unit 9. As in the exemplary embodiment shown in FIG. 1, they are dependent on an operating or quiescent condition in the processor 4.1 or in the second processor 4.2. In this case, the first or second control signal is ascertained in precisely the same way as in the explanation relating to FIG. 1. To this end, a control data input 12 connected to the control unit 9 is provided for supplying control data.

The exemplary embodiment shown in FIG. 2 may be used in mobile data processing appliances, such as in a portable computer or in a mobile radio. The text below is intended to explain this by way of example using the example of dedicated channel weight estimation in a Rake receiver in a UMTS mobile radio system.

Figure 3:
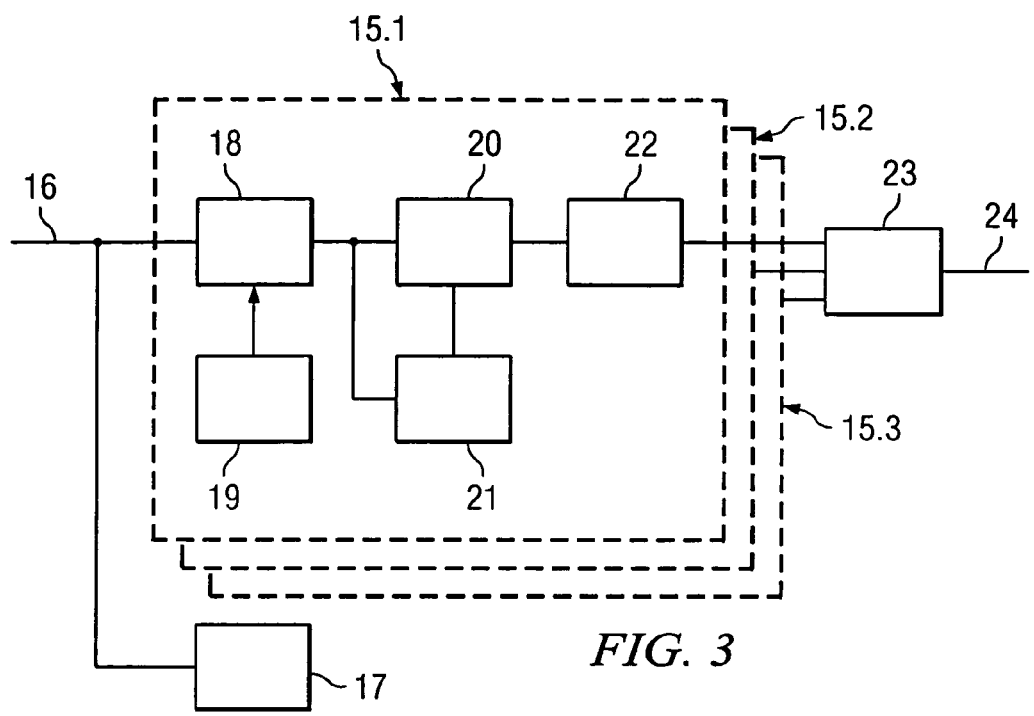

The Rake receiver shown schematically in FIG. 3 has a signal input 16 which is used to supply a received radio signal. The received radio signal is normally transmitted using phase modulation. Accordingly, both an inphase signal I and a quadrature signal Q are received. To simplify illustration, a single signal path has been shown in the Rake receiver shown. From the signal input, the received radio signal is supplied to a first Rake finger 15.1 (shown in dashes), to a second Rake finger 15.2 (shown in dashes), to a third Rake finger 15.3 (shown in dashes) and to a matched filter 17. The received radio signal is supplied to a correlation apparatus 18 in the first Rake finger 15.1. There, it is correlated with a code signal produced by a code generator 19. The correlation despreads the received radio signal and converts it into user data. The user data are supplied to a phase rotator 20 and to a channel weight estimation apparatus 21. The channel weight estimation apparatus 21 has a processor in line with the exemplary embodiment shown in FIG. 2. It is used to ascertain a channel condition. The influence of the channel condition is removed from the user data by the phase rotator 20. The user data corrected in this manner are supplied to an equalizer 22.

The second Rake finger 15.2 and the third Rake finger 15.3 have a design which is identical to that of the first Rake finger 15.1 and which is not shown here. The matched filter 17 determines the instantaneous delay profiles of the received radio signal, which are able to be allocated to various propagation paths in the transmission channel. The consequently ascertained propagation paths with the greatest transmission quality are respectively allocated to one Rake finger from the group comprising the first Rake finger 15.1, the second Rake finger 15.2 and the third Rake finger 15.3. The equalizer 22 compensates for the delays in the signal propagation time on different propagation paths. The user data ascertained in the Rake fingers can thus be combined—usually summed—by a signal combiner, and an output signal with a high signal-to-noise ratio can be supplied to a signal output 24. Advantageously, the output signal takes into account various propagation paths in the transmission channel, which means that the transmitted information can be ascertained better than if just one propagation path were to be taken into account.

The dedicated channel weight estimation carried out in the channel weight estimation apparatus 21 is also called D_CWE or dedicated pilot integration. In this case, the dedicated channel weight estimation is calculated for each Rake finger and for each transmission antenna. To calculate the dedicated channel weight estimation, a pilot signal is used in the dedicated physical channel (DPCH).

Figure 4:
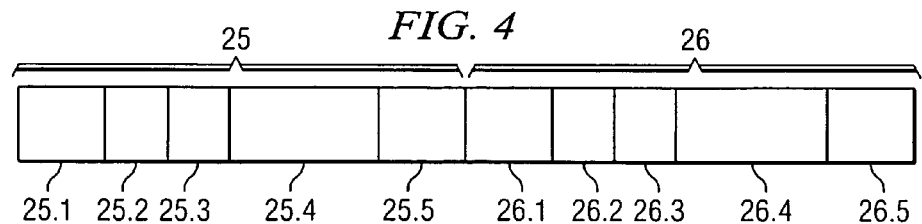

FIG. 4 schematically shows the frame structure of the data transmitted using the DPCH. The frame structure shows a first timeslot 25 and a second timeslot 26, which for their part each comprise five data blocks in a time-division multiplex method. These data blocks are respectively first useful data 25.1, 26.1, data for controlling a transmission power (transmission power control or TPC) 25.2, 26.2, information for combining the transport formats (transport format combination indicator or TFCI) 35.3, 36.3, second useful data 25.4, 26.4 and pilot signals 25.5, 26.5. The first useful data 25.1, 26.1 and the second useful data 25.4 comprise voice information, for example.

The DPCH can be transmitted within a UMTS mobile radio system from a base station using two different antennas. The fading which exists on the transmission channel, particularly as a result of Rayleigh fading, occurs independently for the radio signals transmitted by the two antennas. The transmission diversity using the two antennas therefore allows a higher level signal sensitivity in the mobile radio receiver.

To make use of the transmission diversity, it is possible to use two different pilot signals 25.5, 26.5, which are referred to as "normal" and "STTD" here, for the DPCHs transmitted via a respective antenna. Accordingly, four possible transmission diversity conditions are possible in the UMTS standard (3GPP TE 25.211 V4 3.0).

| Transmission diversity condition | Antenna 1 | Antenna 2 |
|---|---|---|
| STTD (Space Time Transmit Diversity) | Pilot signal "normal" | Pilot signal "STTD" |
| CLTD1 (Closed Loop Transmit Diversity) | Pilot signal "normal" | Pilot signal "STTD" |
| CLTD2 (Closed Loop Transmit Diversity) | Pilot signal "normal" | Pilot signal "normal" |
| Normal | Pilot signal "normal" | off |

The transmission diversity condition CLTD 1 differs from the transmission diversity condition STTD in that the transmission diversity condition CLTD 1 involves feedback to the base station taking place in order to minimize a phase error between the signals transmitted by the two antennas.

The dedicated channel weight estimation can be performed by a data processing apparatus 1 (shown in FIG. 2) in a Rake finger of a UMTS mobile radio receiver. In this case, the processor 4.1 is associated with the pilot signal "normal"—that is to say primarily the antenna 1—while the second processor 4.2 is associated with the pilot signal "STTD"—that is to say solely with the antenna 2.

The operation performed by the processor 4.1 and by the second processor 4.2 to ascertain a channel weighting $h_k$ from the control pilot symbols $P_K$ and the incoming data $d_K$ of the DPCH are essentially the same. The operations differ, in particular, in that different control pilot symbols are supplied to the processor 4.1 or to the processor 4.2 for calculation. Otherwise, the processor 4.1 and the second processor 4.2 are of identical design.

It is obvious that the processor 4.1 and the second processor 4.2 process the data expediently only when pilot signals 25.5, 26.5 are transmitted in the DPCH. The second processor 4.2 is used only during the transmission conditions STTD or CLTD 1. Otherwise, the data supply suppression unit 8.2 suppresses the supply of the received data to the second processor 4.2. The same applies equally when the CPCH is used to transmit the data blocks 25.1, 25.2, 25.3, 25.4 or 26.1, 26.2, 26.3, 26.4, which do not contain pilot signals 25.5, 26.5. Equally, the data supply suppression unit 8.1 suppresses the supply of the aforementioned data blocks to the processor 4.1. Unnecessary operations by the processor 4.1 and the second processor 4.2 are thus prevented.

Figure 5:
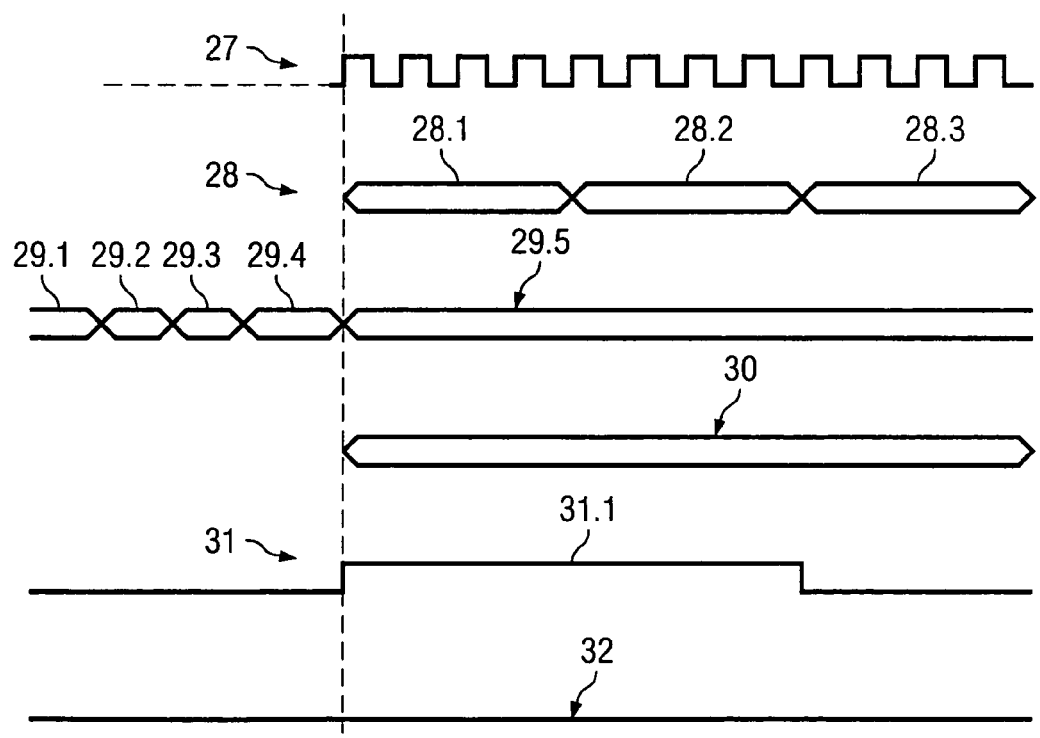
FIG. 5 shows an example of a flow of data in a UMTS mobile radio receiver with a data processing apparatus as shown in FIG. 2.

FIG. 5 shows an example of a flow of data in the UMTS mobile radio receiver described above. In this case, a clock signal 27 prescribes a clock rate. The Rake finger signal 28 with a first section 28.1, with a second section 28.2 and with a third section 28.3 indicates which Rake finger 15.1, 15.2, 15.3 of the UMTS mobile radio receiver is in operation. In this case, the first section 28.1 and the second section 28.2 are set up such that a selected Rake finger 15.1 is in operation which contains a channel weight estimation apparatus 21. In the third section 28.3, the selected Rake finger 15.1 is off, and possibly another Rake finger 15.2, 15.3 is in operation.

A DPCH signal 29 shows a frame of the DPCH channel with a second multiplex of first useful data 29.1, DPC 29.2, TFCI 29.3, second useful data 29.4 and pilot symbol 29.5.

A condition signal 30 indicates a transmission diversity condition for the UMTS mobile radio system.

A first control signal 31 controls the data supply suppression unit 8.1, and the second control signal 32 controls the second data supply suppression unit 8.2.

From the flow of data, it is possible to see that the second control signal 32 indicates a quiescent condition for the second processor 4.2 at any time. The second control signal 32 accordingly has a bit value "0". The first control signal 31 has a bit value "0" in that range in which either no pilot signals are transmitted or the selected Rake finger is off. Otherwise, the first control signal 31 has a bit value "1" and permits the data to be supplied to the processor 4.1. In the example shown, the condition signal 30 will indicate either a transmission diversity condition "normal" or a transmission diversity condition "CLTD2".

I claim:

1. A data processing apparatus comprising:
   at least one data input for receiving radio signals as data,
   a processor configured to process data, wherein the processor is coupled to a power supply during a quiescent condition and comprises at least one input,
   a data supply suppression unit connected between the data input and the at least one input, and configured to suppress or permit supplying of data from the data input to the at least one input,
   a control unit coupled to the data supply suppression unit and configured to permit supply of data to the processor during predetermined timeslots and suppress data otherwise by producing a control signal representing at least one operating condition or the quiescent condition for the processor, the at least one operating condition or the quiescent condition for the processor depending on transmission conditions, and the data supply suppression unit is configured to suppress the supplying of data from the data input to the at least one input when the control signal represents the quiescent condition for the processor,
   at least one second processor configured to process data, said at least one second processor comprising a second input, and
   a second data supply suppression unit connected between the data input and the second input and coupled to the control unit, wherein the control unit is configured to permit supply of data to the second processor during predetermined timeslots and suppress data otherwise by producing at least one second control signal representing at least one operating condition or a quiescent condition for the second processor, the at least one operating condition or quiescent condition for the second processor depending on transmission conditions, the second data supply suppression unit configured to suppress the supplying of the data from the data input to the second input when the control signal represents a quiescent condition for the second processor,
   wherein the processor is in the quiescent condition when the second processor is in the at least one operating condition.

2. A data processing apparatus according to claim 1, wherein the data is transmitted using a time-division multiplex method with at least two timeslots.

3. A data processing apparatus according to claim 2, wherein the control unit is configured to permit supply of data to the processor during predetermined timeslots and suppress data otherwise by producing the control signal representing the quiescent condition for the processor for the duration of at least one timeslot.

4. A data processing apparatus according to claim 1, wherein the data supply suppression unit is configured to provide a constant voltage potential at the input when the control signal represents the quiescent condition for the processor.

5. A data processing apparatus according to claim 4, wherein the constant voltage potential is a zero potential.

6. A data processing apparatus according to claim 1, wherein the data supply suppression unit has at least one AND gate with a third input and a fourth input, the data input being coupled to the third input, and the fourth input being coupled to the control unit in order to receive the control signal.

7. A data processing apparatus according to claim 6, wherein the data supply suppression unit has at least one multiplexer, controlled by the control signal, with a fifth input and a sixth input, and wherein the data input is coupled to the fifth input, and the sixth input is coupled to a constant voltage potential.

8. A mobile data processing device comprising a data processing apparatus according to claim 1.

9. A mobile data processing device according to claim 8, wherein the device is a mobile radio device.

10. A mobile data processing device according to claim 8, wherein the device is a portable computer.

11. A method for transmitting data in a data processing apparatus comprising:
   receiving radio signals as data at a data input,
   supplying data to an input of a processor,
   permitting supply of data to the processor during predetermined timeslots and suppressing data otherwise by producing a control signal representing at least one operating condition or a quiescent condition for the processor, the at least one operating condition or a quiescent condition for the processor depending on transmission conditions, and
   suppressing the supplying of data from the data input to the input when the control signal represents the quiescent condition for the processor, wherein the processor is coupled to the power supply during the quiescent condition,
   permitting supply of data to a second input of at least one second processor during predetermined timeslots and suppressing data otherwise by producing at least one second control signal representing at least one operating condition or a quiescent condition for the second processor, the at least one operating condition or quiescent condition for the second processor depending on transmission conditions, and
   suppressing the supplying of data from the data input to the second input when the second control signal represents a quiescent condition for the second processor,
   wherein the processor is in the quiescent condition when the second processor is in the at least one operating condition.

* * * * *